Patented Mar. 18, 1924.

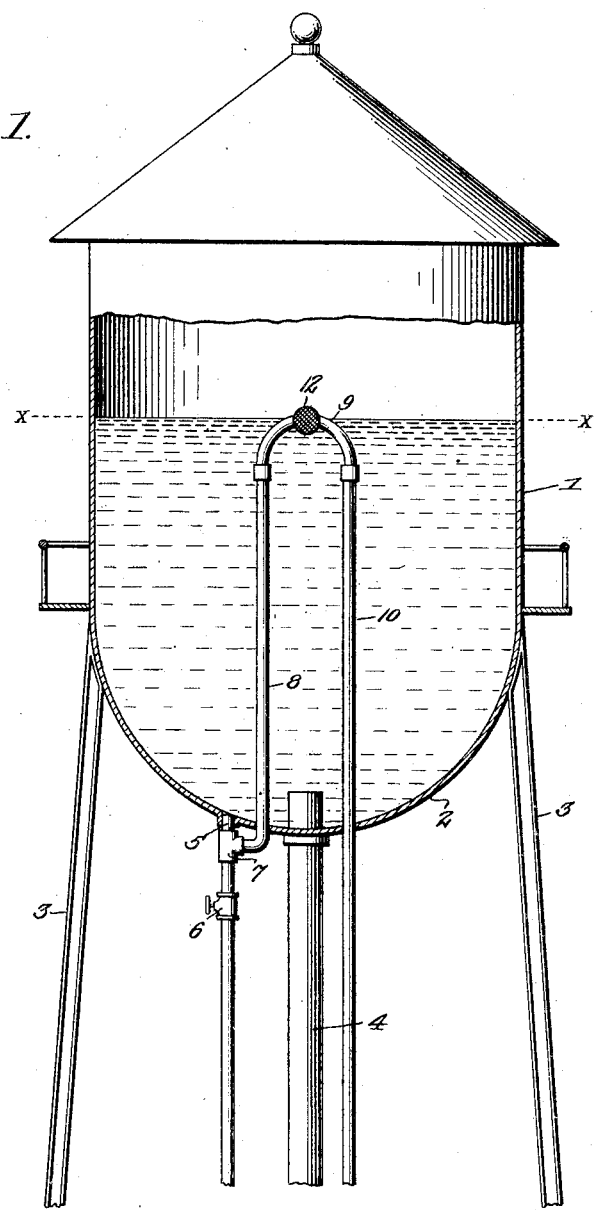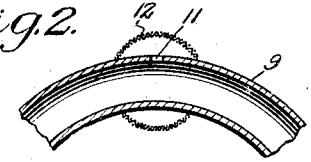

1,487,426

UNITED STATES PATENT OFFICE.

SEARLE E. ANDREWS, OF WASHINGTON, DISTRICT OF COLUMBIA.

TANK.

Application filed December 7, 1922. Serial No. 605,444.

*To all whom it may concern:*

Be it known that I, SEARLE E. ANDREWS, a citizen of the United States, residing at the city of Washington, District of Columbia, have invented certain new and useful Improvements in Tanks; and I do hereby declare the following to be a full, clear, and exact description of the invention, such as will enable others skilled in the art to which it appertains to make and use the same.

The invention relates to certain new and useful improvements in storage tanks, and more particularly to tanks designed to constitute a reservoir for sprinkler systems and similar installations, which require a normal reserve supply of water or other fluid to be maintained in said tanks at all times. It is customary to install such tanks on or adjacent to buildings, which also require a water supply for normal purposes in the operation of the building, which water supply is usually maintained in elevated tanks. It was originally proposed to employ a single tank to contain water for both the sprinkler systems and the normal supply of the building, but, owing to the liability to deplete the supply for the sprinkler system by continued use for the normal uses of the building, stringent regulations have been generally adopted to prevent the use of a single tank for both of the indicated purposes. Various expedients have been suggested to permit the use of a single tank to furnish water for both of the purposes indicated, among the most promising of which was the provision of a tank of such capacity as to contain a body of water sufficient to meet the requirements of the regulations governing sprinkler supplies, and also to provide sufficient excess water to meet the requirements of the normal operations of the establishment to which the tank was applied, by connecting a separate discharge pipe from the tank to the piping of the building for daily use, the intake of the separate supply pipe being at the normal level of the water supply for the sprinkler system, or the like, so that the normal amount of water to supply the sprinkler system would be maintained in the tank at all times. This particular system was found objectionable in that the continuous use of the water for the regular operation of the building caused a large accumulation of sediment to collect in the bottom of the tank, which seriously impaired the efficiency of the sprinkler system, so that this promising expedient was also prohibited. The present invention has for its object to provide a storage tank having a capacity in excess of a normal reserve supply of water or the like, required for a sprinkler system or similar installation, provided with the usual main discharge from the tank connected with the sprinkler system at the bottom of the tank, and an auxiliary discharge communicating with the tank near the bottom thereof, and including means to prevent the operation of the auxiliary discharge when the level of the contents of the tank falls to that of the normal reserve supply, but to permit the water to be drawn freely from the tank for ordinary uses, so long as the volume of water in the tank is in excess of said normal reservoir supply. In the preferred form of the invention, the auxiliary discharge comprises an inverted U-pipe extending upwardly in the tank, having its intake end communicating with the tank near the bottom thereof, and its discharge leg extending through the wall of the tank, said discharge pipe being provided with an open vent located at the normal level of the reserve supply, so that, so long as the amount of water in the tank exceeds said reserve supply, the vent in the pipe is sealed, and the water may be drawn off from the bottom of the tank until the level falls to that of the vent, when the operation of the auxiliary discharge pipe will be automatically stopped, and no further water may be drawn therefrom until an additional amount is supplied to the tank. This arrangement not only ensures the constant maintenance of the normal reserve supply for the sprinkler system or the like, but also prevents the accumulation of sediment in the bottom of the tank, as such sediment would be largely drawn off by the normal operation of the auxiliary discharge. The apparatus affords a further advantage in that it constitutes a definite indicator for accumulated sediment in the tank, evidenced by the turbidity of the water from the auxiliary discharge, thereby requiring the blowing off of the sediment should the same reach a dangerous stage warranted to impair the efficiency of the system connected with the main discharge of the tank. Preferably, the intake of the auxiliary discharge is connected directly to the blow-off connection at the bottom of the tank, to render more certain the indication of the accumulation of sediment in the tank by the condition of the water delivered from the auxiliary discharge.

The invention is illustrated in the accompanying drawings, in which,

Fig. 1 is a sectional elevation, of a more or less diagrammatic character, of a standard tank, including the invention.

Fig. 2 is a sectional detail of the vent in the auxiliary discharge pipe.

Referring to the drawings, 1 indicates a storage tank of any preferred or standard construction, preferably provided with a rounded or downwardly convexed bottom 2, the tank being supported by the usual standards 3. Communicating with the bottom of the tank is a discharge pipe 4, which establishes communication between the tank and a sprinkler system or other form of apparatus for the supply of which a normal reserve of water in the tank must be retained at all times, in conformity with law and usage. In the present instance, the normal level of the reserve supply of liquid in the tank is indicated by the line $x$—$x$, leaving a relatively large portion of the tank above this level for the storage of water for other purposes than the sprinkler system or similar apparatus, such, for example, as the supply of the normal needs in the daily operation of the building or structure to which the tank is applied.

Connected with the bottom 2 of the tank is a blow-off pipe 5 provided with the usual valve 6, which permits any accumulated sediment or foreign material which collects in the bottom of the tank being blown off and discharged when the valve 6 is opened.

Connected by a suitable union 7 with the blow-off pipe 5 is the intake leg 8 of an auxiliary discharge pipe, said leg 8 extending upwardly in the tank and being connected at its top with a U-shaped coupling 9, to which is connected the discharge leg 10 of the auxiliary discharge pipe, which preferably passes through the bottom of the tank, but may, if desired, be passed through the wall of the tank at any point at or below the normal water level of the reserve supply indicated by the line $x$—$x$. At a point coincident with the water level of the reserve supply, the auxiliary discharge pipe is provided with a vent, such as a hole 11, which may be conveniently formed in the U coupling 9, said vent being of sufficient size to admit the air to the siphon-like discharge pipe, and stop the discharge of water therefrom when the water level in the tank falls sufficiently to uncover said vent 11. The vent is preferably covered with a screen 12 to prevent the ingress of foreign material, which might tend to clog the vent or the auxiliary discharge pipe.

As indicated, the level of the water in the tank must be retained at a fixed normal, represented, for example, by the line $x$—$x$, to preserve the reserve supply of liquid for the sprinkler system or the like, at all times. The tank, however, is designed to contain a much larger volume of water than the reserve supply, so that the excess may be used for the normal operation of the building to which the tank constitutes an adjunct. Assuming that the tank is practically full of water, which is supplied from any of the ordinary sources, as, for example, the city supply mains, it will be apparent that all of the water in excess of the normal reserve supply for the sprinkler system may be drawn off as required by way of the auxiliary discharge pipe, the water entering said discharge pipe at the bottom of the tank, and, in the instance indicated, by way of the blow-out connection. So long as the water level is above the vent opening 11 in the discharge pipe, the latter will be kept full of water at all times, ready to be drawn upon for the normal needs of the building. When, however, the level of the water in the tank reaches that of the normal reserve supply for the sprinkler system, the vent opening is uncovered and air is admitted to the discharge pipe, thereby effectively interrupting and stopping the flow of water therefrom, and preventing any depletion of the normal reserve supply. While the invention is illustrated with a simple hole or orifice in the discharge pipe at the level of the normal reserve supply, it will be obvious that any other suitable means for venting the auxiliary discharge pipe and stopping the operation thereof when this level is reached, may be employed, such, for example, as a valve in the auxiliary discharge pipe, which would be operated by a float, to vent the discharge pipe when the decline of the water level to that of the reserve supply causes the float to fall and open the venting valve.

It will be apparent that the capacity of the tank may be increased as desired, over that required to retain the normal reserve supply, with the assurance that substantially clear water will be available at all times for the sprinkler system, because of the fact that the sediment will be either drawn off by the auxiliary discharge, or its presence in dangerous quantities indicated by the condition of the water delivered from the auxiliary discharge, thereby requiring the operation of the blow-off to get rid of the sediment or foreign matter.

What I claim is:

1. A storage tank for combined sprinkler system and building supply having a capacity in excess of a normal reserve supply of liquid for the sprinkler system, a main discharge connected near the bottom of the tank to supply the sprinkler system, and an auxiliary discharge to supply the building communicating with the tank near the bottom thereof, said auxiliary discharge including means to prevent the operation thereof when the level of the contents of the tank falls to that of the normal reserve supply.

2. A storage tank for combined sprinkler system and building supply having a capacity in excess of a normal reserve supply of liquid for the sprinkler system, a main discharge connected near the bottom of the tank to supply the sprinkler system, and an auxiliary discharge pipe to supply the building communicating with the tank near the bottom thereof extending upward within the tank at least to the level of the reserve supply, said auxiliary pipe including means to prevent the operation thereof when the level of the contents of the tank falls to that of the normal reserve supply.

3. A storage tank for combined sprinkler system and building supply having a capacity in excess of a normal reserve supply of liquid for the sprinkler system, a main discharge connected near the bottom of the tank to supply the sprinkler system, and an auxiliary discharge pipe to supply the building communicating with the tank near the bottom thereof extending upward within the tank to at least the level of the reserve supply thence to the exterior of the tank, said auxiliary pipe having means at the normal reserve level to prevent the operation of said pipe when the contents of the tank falls to said level.

4. A storage tank for combined sprinkler and building supply having a capacity in excess of a normal reserve supply of liquid for the sprinkler system, a main discharge connected near the bottom of the tank to supply the sprinkler system, and an auxiliary discharge to supply the building comprising a reverse bend pipe extending upwardly in the tank with its intake end communicating with the tank near the bottom thereof and its discharge end passing through the tank wall, said pipe having an open vent at the normal reserve supply level.

5. A storage tank for combined sprinkler system and building supply having a capacity in excess of a normal reserve supply of liquid for the sprinkler system, a main discharge pipe communicating with the tank near the bottom thereof to supply the sprinkler system, an auxiliary discharge pipe to supply the building, said pipe being of inverted U shape extending upwardly in said tank, with its intake leg communicating with the tank near the bottom thereof and its discharge leg passing through the tank wall, said auxiliary discharge pipe having an open vent at the normal reserve supply level.

6. A storage tank for combined sprinkler system and building supply having a capacity in excess of a normal reserve supply of liquid for the sprinkler system, a main discharge pipe communicating with the tank near the bottom thereof to supply the sprinkler system, a valved sediment discharge pipe connected with the bottom of the tank, and a building supply pipe connected with said sediment discharge pipe between the valve therein and the tank extending upward in the tank to at least the level of the reserve supply thence to the exterior of the tank, said building supply tank having an air vent therein at the normal reserve supply level.

In testimony whereof I affix my signature.

SEARLE E. ANDREWS.